United States Patent Office 3,435,522
Patented Apr. 1, 1969

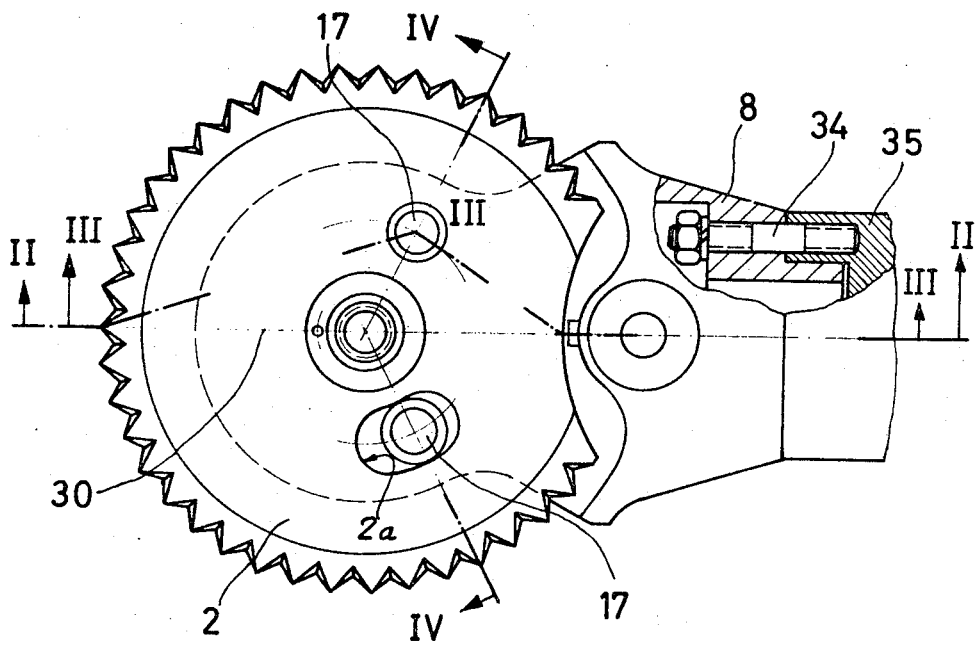
Fig. I
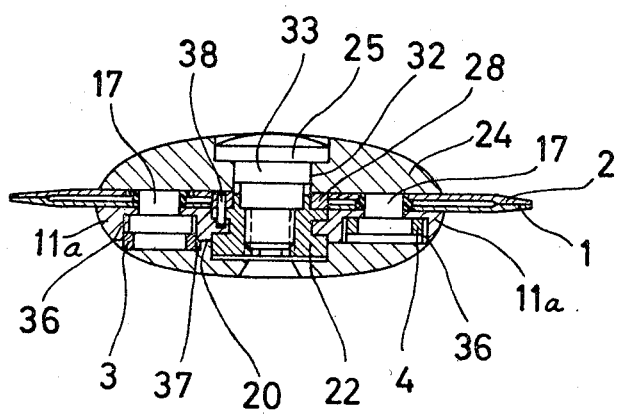
Fig. 4
INVENTORS:
WALTER WEZEL
KURT SCHUMANN
BY Michael J. Striker
their ATTORNEY

3,435,522
APPARATUS FOR SKINNING ANIMALS
Walter Wezel, Maulbronn, Wurttemberg, and Kurt Schumann, Knittlingen, Wurttemberg, Germany, assignors to Schmid & Wezel, Maulbronn, Wurttemberg, Germany
Filed Aug. 25, 1966, Ser. No. 574,988
Claims priority, application Germany, Aug. 26, 1965, Sch 37,616
Int. Cl. A22b 5/16
U.S. Cl. 30—219       10 Claims

ABSTRACT OF THE DISCLOSURE

An apparatus for skinning animals as a support. A pair of cutters is mounted on and located adjacent to one side of the support. A first cover overlies portions of the cutters and is detachably secured to the support. A second cover is located adjacent to the other side of the support and defining therewith a chamber and is secured detachably to the support. A transmission is located in the chamber and includes a rotary driver member journalled both in the support and the second cover and motion transmitting means connecting the driver member with at least one of the cutters. The transmission is withdrawable from the chamber when the second cover is detached from the support.

The present invention relates to apparatus for skinning cattle and other species of animals. More particularly, the invention relates to improvements in power-driven skinning apparatus.

It is an important object of the present invention to provide an apparatus for skinning animals wherein the transmission and the cutters which receive motion from the transmission are mounted in such a way that blood, fragments of hairs and skin, fatty acids and other foreign matter cannot reach the sensitive parts of the transmission.

Another object of the invention is to provide a skinning apparatus of the just outlined characteristics which can be readily assembled or taken apart by resorting to rudimentary tools and in a time-saving manner so that the operator will spend little time for cleaning of such parts which come in actual contact with the body of an animal and which require at least periodic cleaning.

A further object of the invention is to provide an apparatus for skinning animals wherein the removal or reattachment of cutters requires a single and very simple manipulation and wherein the operator can gain access to the transmission with little loss in time so that the operator will be more inclined to inspect and/or lubricate the transmission at frequent intervals.

A concomitant object of the invention is to provide a skinning apparatus which comprises an exceptionally small number of detachable parts so that the operator is less likely to lose or to misplace such parts during cleaning and/or lubrication.

An additional object of the invention is to provide a skinning apparatus whose housing is assembled of a minimal number of separable parts and wherein such housing can substantially completely seal the transmission from the cutters so that the likelihood of penetration of foreign matter into the transmission is very remote and that, particularly by properly cleaning the cutters and other parts which come into actual contact with the bodies of animals, the apparatus will readily stand extended use.

A further object of the invention is to provide a skinning apparatus whose components may be assembled or taken apart for cleaning or lubrication by persons having little technical skill and wherein all moving parts, with the sole exception of cutting edges on the cutters, are fully concealed to avoid injury to the operator.

Briefly stated, one feature of the present invention resides in the provision of an apparatus for skinning animals which comprises a support preferably composed of three substantially plate-like panels the first two of which are located in parallel planes and the third of which extends at right angles to and between the first two planes, a pair of cutters which preferably resemble toothed wheels and are coaxially mounted at one side of the support, most preferably adjacent to one side of one of the first two panels, a first cover which overlies portions of the cutters and is secured to the support by suitable fastener means, preferably by a screw which is coaxial with the cutters and meshes with a suitable bearing sleeve mounted in the support, a second cover which is adjacent to the other side of and defines with the support a chamber whereby such chamber is at least nearly completely sealed from the cutters, a screw or analogous fastener means for detachably securing the second cover to the support, and a transmission which is installed in the chamber and comprises a cam shaft or an analogous rotary driver member which is journalled in the support and preferably also in the second cover. The transmission further comprises suitable motion transmitting means for rotating or oscillating at least one of the cutters. For example, such motion transmitting means may comprise two straps which are mounted on the cam means of the cam shaft and are articulately connected with the cutters so that such cutters oscillate back and forth in response to rotation of the cam shaft.

The cutters can be removed in response to detachment of the first cover which latter can be secured to the support by a single screw, and the transmission is accessible in response to detachment of the second cover.

The novel features which are considered as characteristic of the invention are set forth in particular in the appended claims. The improved skinning apparatus itself, however, both as to its construction and it mode of operation, together with additional features and advantages thereof, will be best understood upon persual of the following detailed description of a specific embodiment with reference to the accompanying drawings, in which:

FIG. 1 is a fragmentary top plan view of a skinning apparatus which embodies the present invention, with one of the covers removed;

FIG. 4 is a transverse section as seen in the direction of arrows from the line IV—IV of FIG. 1.

Figure 3:
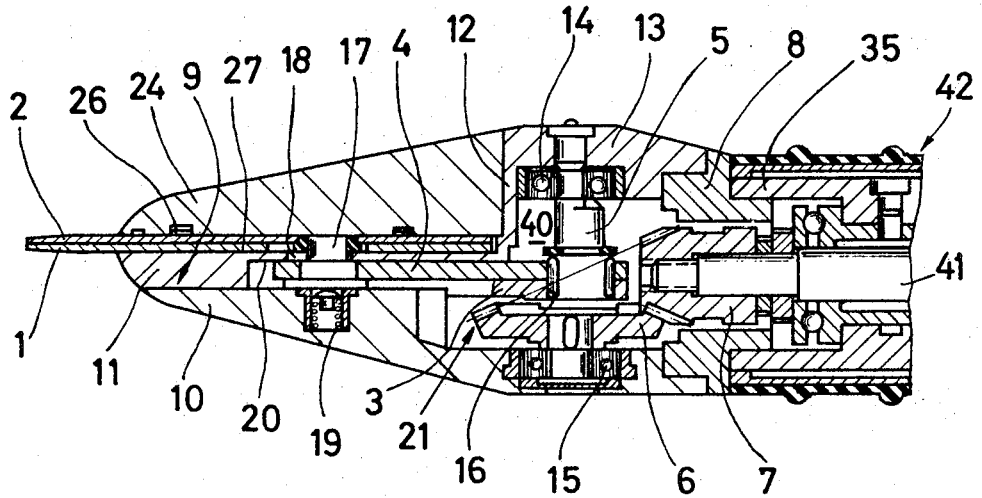
FIG. 3 is a similar section substantially as seen in the direction of arrows from the composite line III—III—III of FIG. 1.

Referring to the drawings in detail, the skinning apparatus comprises a composite housing for two cutters here shown as coaxially mounted toothed wheels 1 and 2. The housing comprises a centrally located component 9, hereinafter called support, a first cover 24 which overlies portions of the cutters 1, 2 at one side of the support 9, and a second cover 10 which is adjacent to the other side of the support 9. The cutters will separate the skin in response to oscillation about their own axes, such oscillation being caused by two motion transmitting straps 3, 4 which form part of a transmission 21 accommodated in a chamber 40 defined mainly by the support 9 and cover 10. This transmission 21 further comprises a rotary driver member here shown as a cam shaft 5 whose ends are journalled in a panel or portion 13 of the support 9 and in the cover 10. The cam shaft 5 is coaxially secured to a bevel gear 6 which meshes with a bevel gear 7 secured to an output member 41 which is driven by a suitable pneumatic motor or the like, not shown. The panel 13 of the support 9 is attached to a carrier 8 which is mounted in a handgrip portion 42. The cover 10 abuts against a portion of the carrier 8, and the aforementioned chamber 40 is defined mainly by the cover 10, by the aforementioned panel 13 and by an intermediate portion or panel 12 of the support 9, this panel 12 extending substantially at right angles to the plane of the panel 13 and also at right angles to the plane of a third panel or portion 11. The latter panel 11 has its side 27 in actual abutment with the cutter 1 and its other side 20 is adjacent to the cover 10. As shown in FIGS. 1 and 4, the housing including the parts 9, 10, 24 surrounds the major part of each cutter and allows only the teeth of such cutters to extend beyond the cover 24 and panel 11. This latter panel has two marginal portions 11a (see FIG. 4) which accommodate between themselves a substantial portion of the cover 10.

The ends of the cam shaft 5 are mounted in antifriction bearings 14, 15 respectively accommodated in the panel 13 and cover 10. The eccentric cam 5a of this shaft carries a needle bearing 16 for adjoining end portions of the straps 3 and 4. The other end portions of the straps 3, 4 are articulately connected with the cutters 1, 2 by pivot pins 17 extending through slots 18 provided in the panel 11. The lower ends of the slots 18 (as viewed in FIG. 3) are sealed by the straps 3, 4 and the sealing action of these straps is enhanced by springs 19 which cause the straps to bear against the underside 20 of the panel 11 to prevent penetration of blood, hairs, fat, fragments of skin and other foreign matter into actual contact with the straps. When the cover 10 is attached to the support 9, the chamber 40 for the transmission is practically entirely sealed from the surrounding air and cannot be readily contaminated by liquid or solid impurities. The slot 2a in the cutter 2 for one of the pivot pins 17 enables this cutter to turn to a certain extent with reference to the cutter 1, and vice versa.

The median portion of the panel 11 carries a bearing sleeve 22 which performs a series of functions. The lower portion of this sleeve 22 (as viewed in FIG. 2) extends beyond the underside 20 of the panel 11 and into a complementary opening 23 of the cover 10 so that the latter is properly located with reference to the support 9. The sleeve 22 is internally threaded to take the stem of a screw 25 or analogous threaded fastener which serves as a means for detachably securing the cover 24 to the panel 11. A boss 33 of the screw 25 fits snugly into an opening 32 of the cover 24 so that the latter is accurately centered with reference to the support 9. Leaf springs 26 which are inserted into recesses provided in the inner side of the cover 24 bear against the cutter 2 to urge the latter against the cutter 1 whereby the cutter 1 bears against the adjoining side 27 of the panel 11. The cutters 1, 2 are rotatable on a wear-resistant ring 28 of hardened metal or the like which is carried by the bearing sleeve 22 and is nonrotatably coupled thereto by an axially parallel pin 38.

Figure 2:
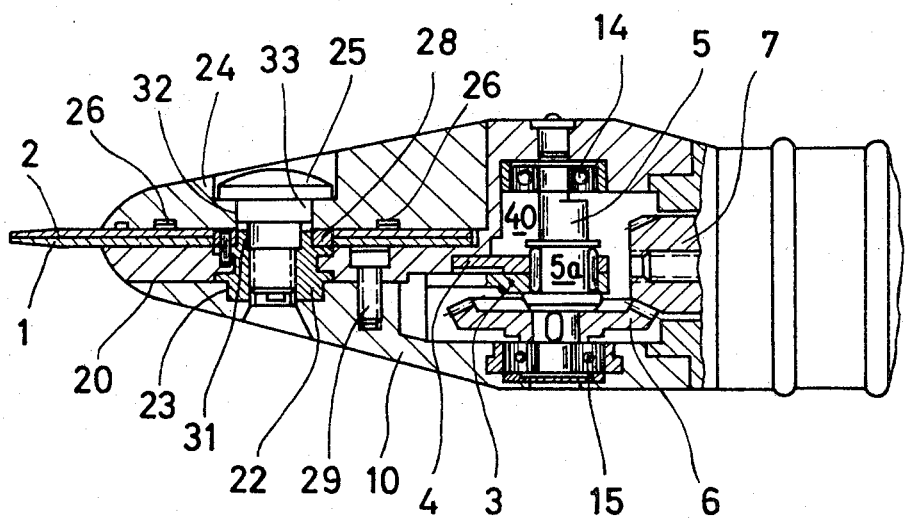
FIG. 2 is a longitudinal central section through the skinning apparatus as seen in the direction of arrows from the line II—II of FIG. 1.

A screw 29 or an analogous threaded fastener connects the support 9 with the cover 10. This screw is accessible and can be rotated by a screwdriver in response to detachment of the screw 25, cover 24, and cutters 1, 2. The head of the screw 29 is recessed into the upper side 27 of the panel 11. The axes of the screws 25, 29 and of the cutters 1, 2 are preferably located in a common symmetry plane 30 shown in FIG. 1. FIG. 2 shows that the bearing sleeve 22 is formed with a cylindrical bore 31 above its internal threads and that this bore receives a cylindrical portion of the screw 25 just above the stem when the screw 25 is driven home to hold the cover 24 against wobbling. Screws 34 (one shown in FIG. 1) serve to connect the aforementioned carrier 8 to a tubular element 35 of the handgrip portion 42.

FIG. 4 shows that the underside 20 of the panel 11 is formed with recesses 36 for the straps 3 and 4. Portions of these straps also extend into recesses 37 provided in the adjoining surface of the cover 10.

When he wishes to clean the cutters 1 and 2, the operator employs a screwdriver to remove the screw 25 and the cover 24. This exposes the cutters which can be readily detached from the ring 28. If the user thereupon wishes to inspect, clean or lubricate the transmission 21, the screwdriver is employed again to remove the screw 29 and the cover 10. It will be seen that dismantling of the apparatus to the extent necessary for inspection, cleaning and/or lubrication of its parts requires little time, rudimentary tools and a minimum of effort. The same holds true for reassembly of the support 9 with the covers 10, 24, screws 25, 29 and cutters 1, 2. Such manipulations can be carried out by unskilled workers and the configuration of the support 9 is such that the covers 10, 24 can be attached thereto only and alone if they are properly located with reference to the panels 11, 12 and 13. The operator is likely to clean and inspect the parts of the apparatus at frequent intervals because he knows that the dismantling or reassembly requires little time and effort.

Many heretofore known skinning apparatus comprise a larger number of detachable parts which are likely to be lost or misplaced during cleaning or lubrication. Such parts include several centering pins, washers, gaskets, numerous screws and other relatively small components.

Without further analysis, the foregoing will so fully reveal the gist of the present invention that others can, by applying current knowledge, readily adapt it for various applications without omitting features which fairly constitute essential characteristics of the generic and specific aspects of our contribution to the art, and therefore, such adaptations should and are intended to be comprehended within the meaning and range of equivalence of the following claims.

What is claimed as new and desired to be protected by Letters Patent is:

1. In an apparatus for skinning animals, a support having a first side and a second side; a pair of cutters mounted on and adjacent to one side of said support; a first cover overlying portions of said cutters; first fastener means detachably securing said first cover to said support; a second cover adjacent to the other side of said support and defining therewith a chamber; second fastener means detachably securing said second cover to said support; and a transmission provided in said chamber and including a rotary driver member journalled in said support and said second cover, said transmission further including motion transmitting means connecting said driver member with at least one of said cutters and said transmission being withdrawable from said chamber in direction towards said other side and in response to detachment of said second cover from said support.

2. A structure as set forth in claim 1, wherein said cutters are constituted by coaxial toothed wheels rotatably carried by said support, said driver member being constituted by a rotary shaft having eccentric cam means and said motion transmitting means comprising a pair of straps mounted on said cam means and each articulately connected with one of said toothed wheels to oscillate such wheels about their common axis in response to rotation of said shaft.

3. A structure as set forth in claim 2, wherein each of said fastener means comprises a screw.

4. A structure as set forth in claim 2, wherein said support comprises a first panel disposed intermediate said wheels and said second cover, a second panel substantially parallel with said first panel and rotatably supporting one end of said shaft, and a third panel located between and disposed in a plane which is substantially normal to the planes of said first and second panels, said chamber being defined at least in part by said second and third panels and said second cover.

5. A structure as set forth in claim 4, wherein said first panel comprises marginal portions which receive between themselves a portion of said second cover.

6. A structure as set forth in claim 4, wherein said first panel is provided with recesses for said straps.

7. A structure as set forth in claim 4, wherein said wheels and said straps are respectively adjacent to the one and the other side of said first panel and wherein said first panel is provided with slots for pivot members connecting said straps with the respective wheels.

8. A structure as set forth in claim 2, further comprising a bearing sleeve mounted in said support and rotatably supporting said wheels, said first fastener means being secured to said bearing sleeve.

9. A structure as set forth in claim 2, further comprising a bearing sleeve mounted in said support and rotatably supporting said wheels, said bearing sleeve having a portion extending into a complementary opening of said second cover to locate said second cover with reference to said support.

10. A structure as set forth in claim 2, wherein each of said fastener means comprises a threaded member having an axis located in a plane which includes the common axis of said wheels.

References Cited

UNITED STATES PATENTS

| | | | |
|---|---|---|---|
| 2,751,680 | 6/1956 | Wezel | 30—219 |
| 2,974,413 | 3/1961 | Williams | 30—219 |
| 3,176,397 | 4/1965 | Schuhmann | 30—219 |
| 3,277,572 | 10/1966 | Eickenberg | 30—206 |

ROBERT C. RIORDON, *Primary Examiner.*

J. C. PETERS, *Assistant Examiner.*

U.S. Cl. X.R.

17—21